US005946869A

United States Patent [19]

Zinbarg

[11] Patent Number: 5,946,869

[45] Date of Patent: Sep. 7, 1999

[54] GARAGE DOOR ASSEMBLY

[75] Inventor: Benson Zinbarg, Stamford, Conn.

[73] Assignee: Sun Hill Industries, Stamford, Conn.

[21] Appl. No.: 09/002,838

[22] Filed: Jan. 5, 1998

[51] Int. Cl.[6] .............................. E06B 3/30; B62D 63/04

[52] U.S. Cl. ........................ 52/202; 52/3; 52/63; 52/105; 40/601; 160/179

[58] Field of Search .................................. 52/3, 63, 105, 52/5, 202, 506.01, 745.15, 745.06, 23; 182/138; 40/601, 603; 160/179

[56] References Cited

U.S. PATENT DOCUMENTS

| | | | |
|---|---|---|---|
| 4,590,714 | 5/1986 | Walker | 52/3 |
| 4,815,562 | 3/1989 | Denny et al. | 182/138 |
| 4,875,549 | 10/1989 | Denny et al. | 182/138 |
| 5,197,239 | 3/1993 | Glynn et al. | 52/63 |
| 5,649,390 | 7/1997 | Davidson | 52/30 |
| 5,839,237 | 11/1998 | Davidson | 52/3 |

*Primary Examiner*—Carl D. Friedman
*Assistant Examiner*—Winnie Yip
*Attorney, Agent, or Firm*—David P. Gordon; David S. Jacobson; Thomas A. Gallagher

[57] ABSTRACT

A garage door decorative cover assembly for use on an exterior surface of a garage door made of a plurality of door panels permitted to rotate relative to each other when the garage door moves from a closed position to an open position includes at least one flexible panel and, for each flexible panel, a first fixing means and at least one resilient second fixing means. Each flexible panel has a first end, a second end, a front surface and a back surface. With respect to each flexible panel, the first fixing means attaches the first end of the flexible panel to the exterior surface of the garage door, and the resilient second fixing means couples the second end of the flexible panel to the exterior surface of the garage door such that the flexible panel is held taut when the garage door is in both open and closed positions. The flexible panels are provided with fanciful holiday, seasonal, or other celebratory indicia. Preferably the indicia on the panels, in side-by-side display on the garage door, together form a composite illustration.

21 Claims, 4 Drawing Sheets

GARAGE DOOR ASSEMBLY

BACKGROUND OF THE INVENTION

1. Field of the Invention

This invention relates broadly to flexible panels affixable to a garage door. More particularly, this invention relates to decorative flexible panels having seasonal, holiday, festive, or celebratory indicia and being easily removably affixed to a movable multi-panel garage door to provide an exterior decoration.

2. State of the Art

During certain times of the year, holiday, seasonal, and festive decorative objects are very popular. In the fall, around the time of the Halloween celebration, it is common to decorate one's home with decorative objects having a ghoulish theme, e.g., jack o'lanterns, ghosts, witches, and monsters. Following the Halloween celebration, and in the winter months, the image of Santa Claus and other Christmas themed images are everpresent in holiday displays. During the spring, with the approach of the Easter holiday, images of Easter bunnies are often included in decorative displays. In addition, when celebrating a birthday, an anniversary, or a graduation with a home-based party, it is common to decorate the home with a celebratory display.

In homes having a garage, one of the largest flat surfaces on the front of the home is the garage door surface. Therefore, the garage door surface is apparently well-suited to holding a large decorative display such as a large decorated flexible panel; that is, unless the display hinders the operation of the garage door. Operation of the garage door is important because seasonal and holiday decorations may be displayed for a relatively long period of time, such as a month.

However, permitting a garage door to be opened and closed while covered with a decorative panel is not easy. It will be appreciated that a majority of garage doors are made of hinged door panels having lateral wheels which ride in a track. Due to rotation at the hinges, when a garage door is a partially open or an open position gaps are created between the panels at the hinges and the vertical length across the exterior of all of the panels of the garage door (i.e., from the topmost door panel to the bottommost door panel) is relatively longer than when the door is in a closed position and the gaps are eliminated. Therefore, any decorative panel for a garage door must be able to remain on the exterior surface of the garage door which, in effect, changes in length as it is opened and closed.

A decorative panel having sufficient extra material such that the garage door is permitted to move from an open position to a closed position will buckle when closed, and the extra material may become caught in the closing gaps as the door closes, potentially causing the panel to tear. Moreover, a loose display will have an undesirable messy appearance. On the other hand, a tightly held decorative panel which does not permit movement of the panel relative to the exterior surface of the garage door will either prevent the garage door from fully opening, or will cause inadvertent removal of the panel from the garage door or tearing of the panel as the garage door is opened. Either scenario is undesirable.

U.S. Pat. No. 5,649,390 to Davidson describes a single panel flexible garage door cover which permits the garage door to which it is attached to open and close. The panel is draped over the front of a garage door and has upper and lower ends which extend around the upper and lower edges, respectively, of the garage door to the back of the garage door. The upper and lower ends of the panel are tethered together with elastic cords. As a result, when the garage door is opened, the elasticity of the cords permits movement of the panel relative to the garage door to allow the door to open. However, the door cover has several drawbacks. First, use of the cover requires a complicated webbing of elastic cords through eyelets in the cover and around axles of the garage door wheels, a time consuming process. Second, the elastic cords place the cover, especially at the eyelets, under constant tension (whether in open or closed positions) and require the garage door cover to be made from a relatively thick flexible material. Third, when the door is an open position, the web of elastic cords extends between the upper and lower ends of the cover and thereby extends into the head room of the garage.

SUMMARY OF THE INVENTION

It is therefore an object of the invention to provide a decorative garage door cover which when attached to the exterior surface of a garage door permits the garage door to open and close without the cover becoming detached.

It is another object of the invention to provide a decorative garage door cover which is held taut and has a clean appearance on the garage door.

It is a further object of the invention to provide a decorative garage door cover which is easy to attach to a garage door.

It is an additional object of the invention to provide a decorative garage door cover which is easily removable from a garage door.

It is also an object of the invention to provide a decorative garage door cover which, upon removal, will not mar a garage door to which it is attached.

A further object of the invention to provide a decorative garage door cover which does not deplete head room in a garage when a garage door to which it is attached is in an open position.

Another object of the invention to provide a decorative garage door cover which is inexpensive to manufacture and can be made of light-weight materials.

An additional object of the invention to provide a decorative garage door cover which can be printed upon by conventional printing techniques.

It is still a further object of the invention to provide a decorative garage door cover which is waterproof.

In accord with these objects, which will be discussed in detail below, a garage door cover assembly for use on an exterior surface of a garage door is provided. The type of garage door for which the garage door cover assembly is designed typically has a plurality of door panels permitted to rotate relative to each other when the garage door moves from a closed position to an open position. The garage door cover assembly includes at least one flexible panel and, for each flexible panel, a first fixing means and at least one resilient second fixing means. Each flexible panel has a first end, a second end, a front surface and a back surface. With respect to each flexible panel, the first fixing means attaches the first end of the flexible panel to the exterior surface of the garage door. For each flexible panel, the resilient second fixing means couples the second end of the flexible panel to the exterior surface of the a garage door such that the flexible panel is held taut when the garage door is in both open and closed positions. According to a preferred embodiment, the resilient second fixing means includes a holding member removably fixedly attached to the lower exterior surface of the garage door and a resilient member held taut between the second end of the flexible panel and the holding member. For example, the resilient member may be a conventional rubber band and the holding member may be hook. The flexible panels are provided with fanciful holiday, seasonal, or other celebratory indicia. Preferably the indicia on the panels, in side-by-side display on the garage door, together form a composite illustration.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
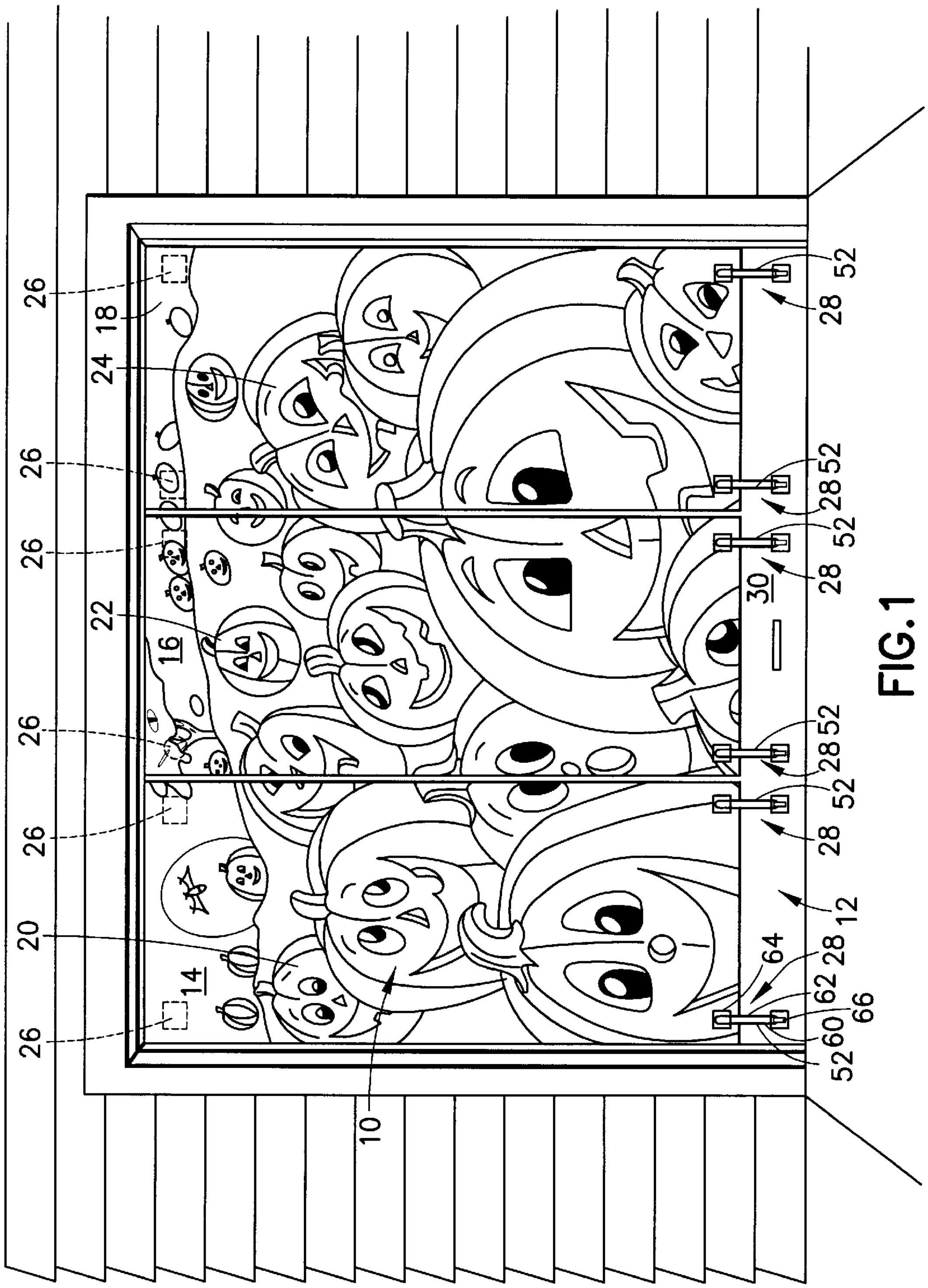
FIG. 1 is a perspective view of the garage door cover assembly of the invention attached to a garage door which is in a closed position.

Turning now to FIG. 1, a garage door decorative cover assembly 10 is shown attached to a garage door 12. The garage door decorative cover assembly is generally comprised of three flexible panels 14, 16, 18, each having indicia 20, 22, 24 provided thereon, upper fixing means 26, and lower fixing means 28. As described in detail below, the panels, which are preferably made from 1–2 mil sheets of waterproof plastic such as polyethylene, are attached to the exterior surface 30 of the garage door 12 with the upper and lower fixing means 26, 28 such that the panels are held taut when the garage door 12 is in both open and closed positions. Preferably, the indicia on each of the panels 14, 16, 18 is such that a composite illustration, for example, a pumpkin patch, is formed by the side-by-side display of the panels.

Figure 3:
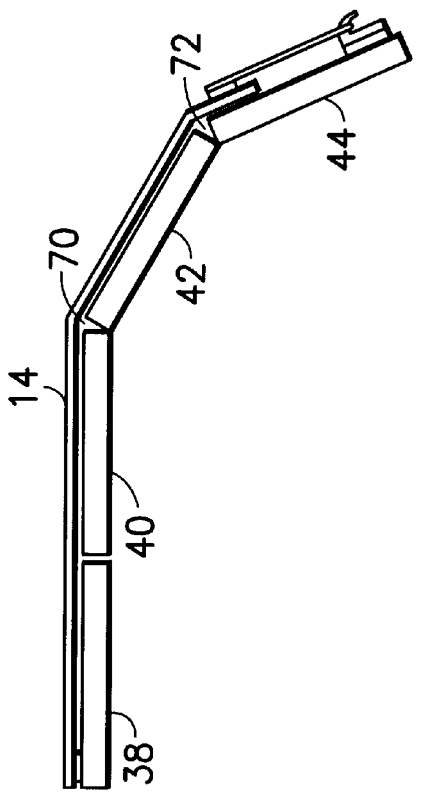
FIG. 3 is a side view of the garage door decorative cover of the invention attached to a garage door which is in an open position.
Figure 2:
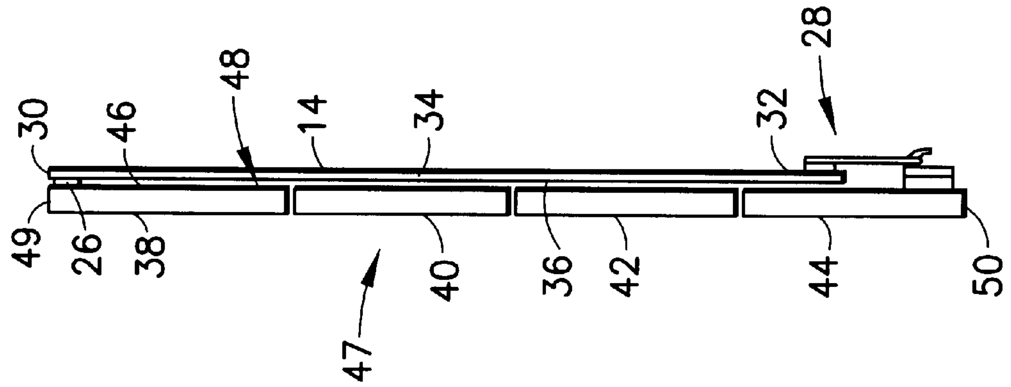
FIG. 2 is a side view of the garage door decorative cover assembly of the invention attached to a garage door which is in a closed position.

Referring to FIGS. 2 and 3, the garage door decorative cover assembly 10 is adapted for attachment to a multi-panel garage door. It will be appreciated that garage doors are generally made from a plurality of door panels, e.g., four door panels 38, 40, 42, 44 which are permitted to rotate relative to each other when the garage door moves from a closed position (FIG. 2) to an open position (FIG. 3). The garage door has an interior surface 47 facing the inside of the garage, an exterior surface 48, an upper edge 49 on the top surface of the topmost door panel 30, and a lower edge 50 on the lower surface of the lowermost door panel 44. The attachment of the decorative cover assembly 10 to the exterior surface 48 of the garage door 12 is described, for the purpose of clarity, with respect to one of the flexible panels 14.

Figure 4:
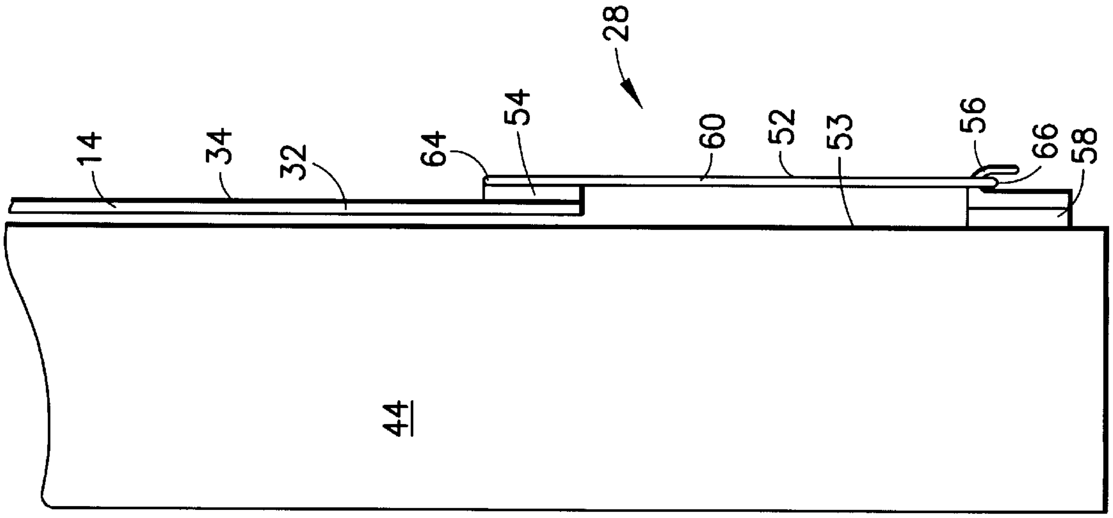
FIG. 4 is a broken enlarged side view of the garage door cover of the invention attached to a garage door which is in a closed position.

Referring to FIG. 2, flexible panel 14 has a top portion 30, a bottom portion 32, a front surface 34, and a back surface 36. Each upper fixing means 26 (and a plurality of spaced-apart upper fixing means may be used) is preferably a piece of removable, non-marring, double-sided foam tape, such as Magic Removable Mounts™ sold by Miller Studios of New Philadelphia, Ohio, although other adhesives may be used. With respect to each piece 26 of double-sided tape, one side of the tape is adhered to the exterior surface 46 of the garage door at the topmost door panel 30. The back surface 36 of the top portion 30 of the flexible panel 14 is adhered to the other side of the upper fixing means 26. Referring to FIGS. 2 and 4, and according to a preferred embodiment, the lower fixing means 28 generally includes two resilient members 52, each of which is coupled between the bottom portion 32 of the flexible panel 14 and the exterior surface 53 of the garage door at the lowermost garage door panel 44. The resilient members 52 are preferably conventional rubber bands, each having two elongate sides 60, 62 and two looped ends 64, 66 (see FIGS. 1 and 4). The resilient members 52 are coupled to the flexible panel 14 with an adhesive 54, e.g., the previously described double-sided foam tape or conventional cellophane tape or staples. The resilient members 52 are coupled to the garage door preferably using hook members 56. Likewise, the hook members 56 are coupled to the exterior surface of the garage door with preferably a removable, non-marring, coupling means 58 such as the double-sided foam tape, described above. As a result of the resiliency of the resilient members and the coupling of the resilient members between the flexible panel 14 and the garage door panel 44, the flexible panel is held taut between the upper and lower fixing means 26, 28 when the garage door is in both open and closed positions, as described below.

Figure 6:
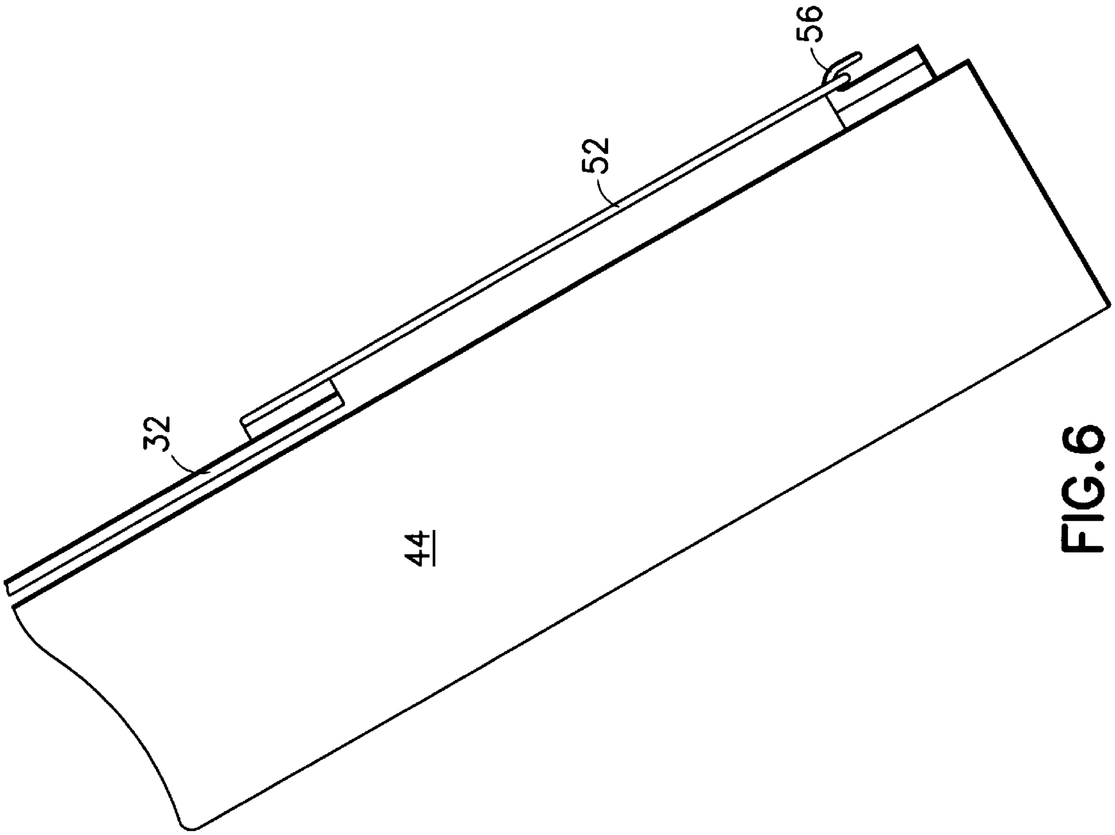
FIG. 6 is a broken enlarged side view of the garage door cover of the invention attached to a garage door in an open position.
Figure 5:
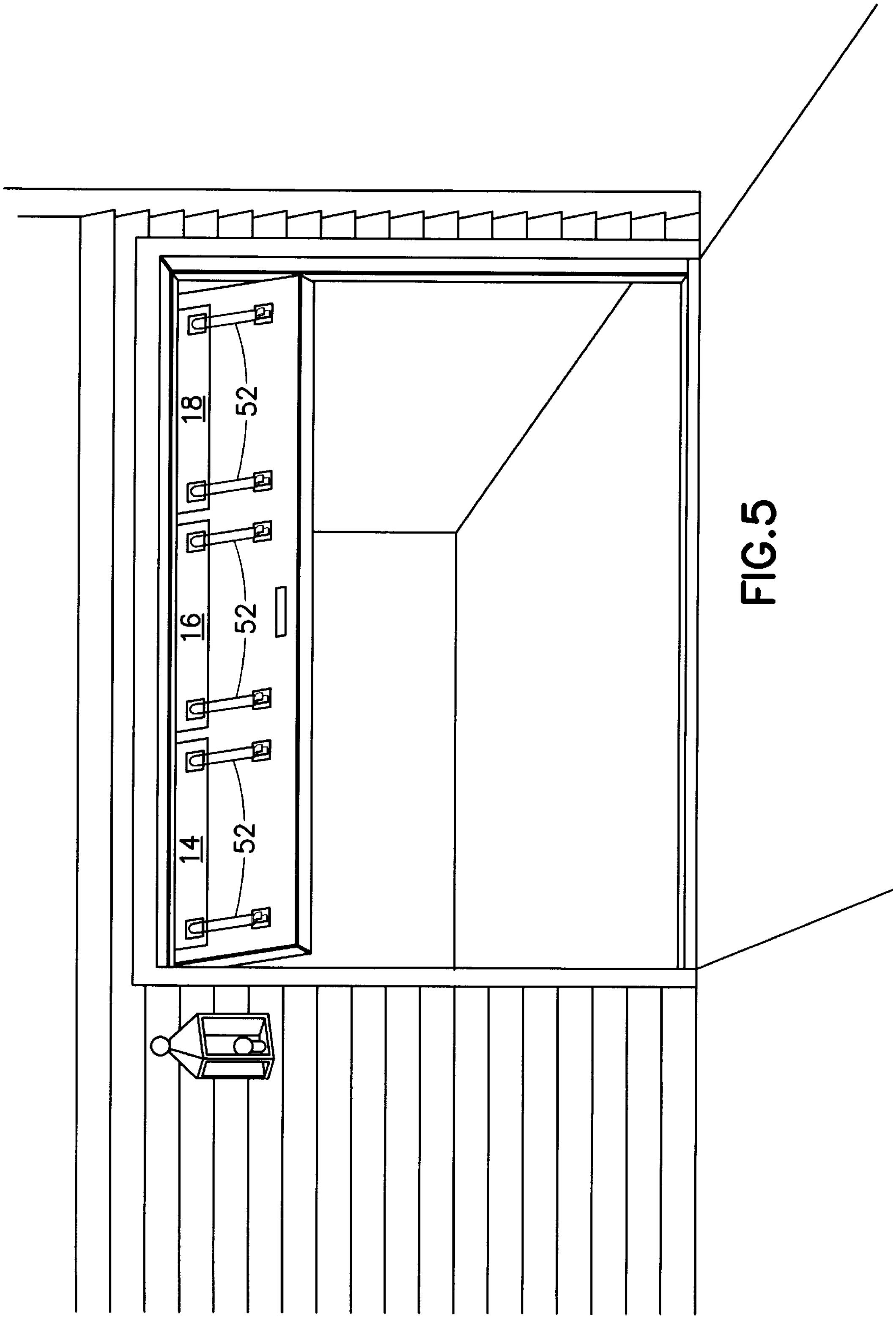
FIG. 5 is a perspective view of a lower portion of the garage door decorative cover of the invention attached to a garage door which is in an open position.

FIGS. 5 and 6 illustrate the function of the resilient member 52 in maintaining the flexible panel in a taut configuration as the garage door is opened. As the door is opened, the plurality of door panels rotate relative to each other; for example, the door panels may be oriented such that one or more door panels 38, 40 are relatively horizontal, and others of the door panels 42, 44 are oriented at some intermediate angle between vertical and horizontal. The relative rotation of the door panels 38, 40, 42, 44 creates gaps 70, 72 (FIG. 3) between the panels which, in effect, increase the distance along the exterior surface 48 between the top edge 49 of the topmost door panel 38 and the bottom edge 50 of the bottommost door panel 44 relative to the distance along the exterior surface between the same points when the door is closed and all the door panels are relatively vertical. As the distance between those points increases, so must the length of the garage door cover assembly if the assembly, affixed at both its ends to the garage door, is not to be pulled from its fixation points or torn. The resilient members 52 are able to stretch between the bottom portion 32 of the flexible panel 14 and the hook members 56 (from its length in FIG. 4 to its longer length in FIG. 6) to accommodate the opening of the garage door. Moreover, as the garage door is moved from an open position to a closed position, the tensioned flexible panel 14 is pulled taut and prevented from being caught in closing gaps 70, 72 (FIG. 3). An easy-to-assemble and inexpensive-to-manufacture garage door decorative cover assembly is thereby provided.

According to a preferred embodiment of the invention, three flexible 1–2 mil polyethylene panels, each approximately 60–72 inches in height by 30 inches in width, are provided with six rubber bands (each 2 to 10 inches in an at rest position), eighteen pieces of one inch by one inch double sided foam tape, and six plastic hooks. The panels together depict a seasonal, holiday, or celebratory theme.

There have been described and illustrated herein a garage door decorative cover. While a particular preferred embodiment of the invention has been described, it is not intended that the invention be limited thereto, as it is intended that the invention be as broad in scope as the art will allow and that the specification be read likewise. Thus, while the decorative cover is shown as comprising three flexible panels, for ease of manufacture and especially for ease of printing indicia thereon, it will be appreciated that the decorative cover may be made from one, two or more than three panels as well. Furthermore while particular types of materials have been disclosed, it will be understood that other materials can be used as well. For example, and not by way of limitation, while polyethylene plastic is disclosed as a preferred material for the flexible panels, polypropylene, polyvinylchloride, paper, fabric, and other materials can also be used. Also, while it is preferable to use two pieces of adhesive, two resilient members, and two hook members per flexible panel, it will be appreciated that one of each of the above or more than two of each of the above may alternatively be used. In addition, while the resilient members are shown as being components of the lower fixing means, it will be appreciated that one or more resilient members may alternatively or additionally be provided with respect to the upper fixing means; the described configuration of the upper fixing means may be provided as a lower fixing means and the described configuration of the lower fixing means may be provided as an upper fixing means. Also, while a rubber band is preferred for the resilient member, it will be recognized that other resilient, elastic, or stretchable materials and members may be used as well. For example, instead of a conventional rubber band, a stretchable fabric or spring may be used. In addition, while a particular adhesive is preferred for attaching the holding member and the panels to the exterior surface of the garage door, it will be appreciated that other fixing means may be used as well, e.g., staples, tacks, large-headed nails, other non-marring and removable adhesives in tape, foam mount, or other form, and, while not preferred, even marring or non-removable adhesives. Moreover, while hook members are preferred for attaching the resilient members, it will be appreciated that other configurations which do not use hook members may be used as well. For example, other holding means for holding the resilient members, such as clamps, can be similarly used. Moreover, no intermediary means for holding the resilient members is required, and the resilient members can be attached directly to the garage door, e.g., via an adhesive or tack; i.e., what is important is the coupling of a resilient member between at least one of the upper and lower portions of the flexible panel and the garage door. It will therefore be appreciated by those skilled in the art that yet other modifications could be made to the provided invention without deviating from its spirit and scope as so claimed.

What is claimed is:

1. A garage door assembly, comprising:

a) garage door having a plurality of door panels which are permitted to rotate relative to each other when said garage door moves from a closed position to an open position, said garage door having an exterior surface;

b) a flexible panel having a first end, a second end, a front surface and a back surface;

c) a first fixing means attaching to said first end of said flexible panel and said exterior surface for attaching said first end of said flexible panel to said exterior surface; and d) a second fixing means for coupling said second end to said exterior surface such that said flexible panel is held taut against said exterior surface in both said open position and said closed position.

2. A garage door assembly according to claim 1, wherein:

said first fixing means removably mounting said first end to said exterior surface.

3. A garage door assembly according to claim 2, wherein:

said first fixing means is non-marring to said exterior surface when said first fixing means is removed from said exterior surface.

4. A garage door assembly according to claim 1, wherein:

said second fixing means comprises at least one resilient member.

5. A garage door assembly according to claim 4, wherein:

said second fixing means further comprises at least one holding means for holding said at least one resilient member, said holding means being coupled to said exterior surface and said at least one resilient member being coupled to said flexible member.

6. A garage door assembly according to claim 5, wherein:

said holding means is at least one hook member, wherein said at least one resilient member includes a loop member and said at least one said hook member holds said loop member of said at least one resilient member.

7. A garage door assembly according to claim 4, wherein:

said second fixing means is removably coupled to said exterior surface.

8. A garage door assembly according to claim 1, wherein:

said second fixing means removably couples said second end to said exterior surface.

9. A garage door assembly according to claim 1, wherein:

said front surface of said flexible panel is provided with indicia.

10. A garage door assembly according to claim 9, wherein:

said indicia is one of fanciful holiday indicia, fanciful seasonal indicia, and fanciful celebratory indicia.

11. A garage door assembly according to claim 1, wherein:

said flexible panel is made from waterproof plastic.

12. A garage door assembly, comprising:

a) a garage door having a plurality of door panels which are permitted to rotate relative to each other when said garage door moves from a closed position to an open position, said garage door having an exterior surface;

b) a plurality of flexible panels, each having a first end, a second end, and a front surface;

c) for each of said plurality of flexible panels, a first fixing means attaching to said first end of said flexible panel and said exterior surface for attaching said first end of one of said flexible panel to said exterior surface;

d) for each of said plurality of flexible panels, a resilient second fixing means for coupling said second end to said exterior surface such that said flexible panel is held taut against said exterior surface in both said open position and said closed position; and e) a indicia provided on said front surface of each of said plurality of flexible panels, such that when said plurality of flexible panels are positioned side-by-side said indicia form a composite illustration.

13. A garage door assembly according to claim 12, wherein:

said first fixing means of each of said plurality of flexible panels removably mounting said first end of each of said plurality of flexible panels to said exterior surface.

14. A garage door assembly according to claim 13, wherein:

said first fixing means is non-marring to said exterior surface when each of said plurality of flexible panels is removed from said exterior surface.

15. A garage door assembly according to claim 12, wherein:

said second fixing means comprises at least one resilient member.

16. A garage door assembly according to claim 15, wherein:

said second fixing means further comprises at least one holding means for holding said at least one resilient member, said holding means being coupled to said exterior surface and said at least one resilient member being coupled to said flexible member.

17. A garage door assembly according to claim 12, wherein:

said plurality of flexible panels are made from waterproof plastic.

18. A garage door assembly, comprising:

a) a garage door having predetermined dimensions and including a plurality of door panels which are permitted to rotate relative to each other when said garage door moves from a closed position to an open position, said garage door having an exterior surface;

b) a flexible panel having top and bottom portions and dimensioned such that in no dimension is a length of said flexible panel greater than said predetermined dimensions of said garage door;

c) first attachment means attaching to said first end of said flexible panel and said exterior surface for fixing one of said top and bottom portions of said flexible panel to said exterior surface of said garage door; and d) second attachment means for fixing the other of said top and bottom portions of said flexible panel to said exterior surface of said garage door, said second attachment means permitting partial movement of said other of said top and bottom portions of the flexible panel to permit said garage door to move from said closed position to said open position and back to said closed position while maintaining said flexible panel in a taut condition and without said flexible panel becoming separated from said exterior surface of said garage door.

19. A garage door assembly according to claim 18, wherein:

said second attachment means includes at least one resilient member.

20. A garage door assembly according to claim 18, wherein:

said flexible panel includes a front surface on which indicia is provided.

21. A garage door assembly according to claim 18, wherein:

said flexible panel is made from waterproof plastic.

* * * * *

UNITED STATES PATENT AND TRADEMARK OFFICE

PATENT NO. : 5,946,869
DATED : September 7, 1999
INVENTOR(S) : Benson Zinbarg

It is certified that error appears in the above-identified patent and that said Letters Patent is hereby corrected as shown below:

On the title page, item [56] insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 9 | 5 | 0 | 7 | 4 | 6 | | 3/1910 | Chamberlin | | | |
| | 3 | 3 | 1 | 0 | 8 | 9 | 9 | | 3/1967 | Hart et al. | 40 | 125 | |
| | 4 | 3 | 3 | 5 | 7 | 7 | 4 | | 6/1982 | Price | 160 | 84R | |
| | 5 | 6 | 1 | 1 | 3 | 8 | 2 | | 3/18/97 | Sferra | 160 | 113 | |
| | 5 | 5 | 5 | 5 | 6 | 5 | 9 | | 9/1996 | Hade | 40 | 604 | |
| | 5 | 6 | 0 | 8 | 9 | 9 | 2 | | 3/11/97 | Floyd | 52 | 3 | |
| | 5 | 6 | 4 | 7 | 1 | 5 | 7 | | 7/15/97 | Kasahara | 40 | 79.2 | |
| | 5 | 6 | 8 | 5 | 0 | 5 | 4 | | 11/11/97 | Yasnogorodskiy | 29 | 446 | |
| | 5 | 4 | 1 | 7 | 2 | 7 | 3 | | 05/23/95 | Bamonte | 160 | 368.1 | |
| | 5 | 7 | 7 | 6 | 5 | 5 | 8 | | 07/07/98 | Wotton | 428 | 16 | |

Signed and Sealed this

Eleventh Day of January, 2000

*Attest:*

Q. TODD DICKINSON

*Attesting Officer*

*Acting Commissioner of Patents and Trademarks*